(12) United States Patent
Hall et al.

(10) Patent No.: US 8,164,435 B2
(45) Date of Patent: Apr. 24, 2012

(54) SUBSCRIBING TO ALARMS AND EVENTS IN A HIERARCHY

(75) Inventors: Kenwood H. Hall, Hudson, OH (US);
Eric G. Dorgelo, Port Moody, CA (US);
David K. Johnson, Waukesha, WI (US);
Dale Sapach, Roberts Creek, CA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 13/041,126

(22) Filed: Mar. 4, 2011

(65) Prior Publication Data

US 2011/0156895 A1    Jun. 30, 2011

Related U.S. Application Data

(63) Continuation of application No. 11/537,422, filed on Sep. 29, 2006, now Pat. No. 7,902,965.

(51) Int. Cl.
*G08B 23/00* (2006.01)
*G08B 9/00* (2006.01)

(52) U.S. Cl. .................. 340/501; 340/506; 340/286.01; 340/286.02; 340/635

(58) Field of Classification Search .................. None
See application file for complete search history.

(56) References Cited

U.S. PATENT DOCUMENTS

| | | | |
|---|---|---|---|
| 5,818,713 A | 10/1998 | Uchihara et al. | |
| 5,892,440 A | 4/1999 | Bryan | |
| 6,098,028 A | 8/2000 | Zwan et al. | |
| 6,281,790 B1 | 8/2001 | Kimmel et al. | |
| 6,437,812 B1 | 8/2002 | Giles et al. | |
| 6,445,774 B1 | 9/2002 | Kidder et al. | |
| 6,509,830 B1 * | 1/2003 | Elliott | 340/286.02 |
| 6,535,122 B1 | 3/2003 | Bristol | |
| 6,643,355 B1 | 11/2003 | Tsumpes | |
| 6,646,564 B1 * | 11/2003 | Azieres et al. | 340/679 |
| 6,977,585 B2 * | 12/2005 | Falk et al. | 340/506 |
| 7,016,312 B1 | 3/2006 | Semaan et al. | |
| 7,301,448 B1 | 11/2007 | Usery et al. | |
| 7,764,185 B1 * | 7/2010 | Manz et al. | 340/601 |
| 2003/0090712 A1 | 5/2003 | Lenz et al. | |
| 2003/0105535 A1 | 6/2003 | Rammler | |
| 2004/0250108 A1 | 12/2004 | Parsons et al. | |
| 2006/0206940 A1 * | 9/2006 | Strauss et al. | 726/23 |
| 2007/0273480 A1 * | 11/2007 | Burkman et al. | 340/7.52 |

OTHER PUBLICATIONS

OA dated Mar. 26, 2009 for U.S. Appl. No. 11/537,422 21 pages.
OA dated Nov. 2, 2009 for U.S. Appl. No. 11/537,422 14 pages.
OA dated May 26, 2010 for U.S. Appl. No. 11/537,422 13 pages.

* cited by examiner

*Primary Examiner* — Julie Lieu
(74) *Attorney, Agent, or Firm* — Turocy & Watson, LLP; Alexander R. Kuszewski; John M. Miller

(57) ABSTRACT

An alarm provision system comprises a recognizer component that receives an alarm/event and recognizes the alarm/event. A provision component analyzes hierarchical relationships associated with an industrial environment and automatically provides a subscribing entity with the alarm/event and at least one other alarm/event that is related to the received alarm/event, the provision of the at least one other alarm/event is based at least in part upon the analysis of the hierarchical relationships.

19 Claims, 13 Drawing Sheets

SUBSCRIBING TO ALARMS AND EVENTS IN A HIERARCHY

RELATED APPLICATIONS

This application is a Continuation of U.S. patent application Ser. No. 11/537,422, filed Sep. 29, 2006 and entitled "SUBSCRIBING TO ALARMS AND EVENTS IN A HIERARCHY", the entirety of which is incorporated herein by reference.

TECHNICAL FIELD

The claimed subject matter relates generally to alarms events within an industrial setting, and, more particularly, to subscribing to alarms and events.

BACKGROUND

Due to advances in computing technology, businesses today are able to operate more efficiently when compared to substantially similar businesses only a few years ago. For example, high speed data networks enable employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, activities that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases (or web services referencing databases) that are accessible by system/process/project managers on a factory floor. For example, sensors and associated software can detect a number of instances that a particular machine has completed an operation given a defined amount of time. Further, data from sensors can be delivered to a processing unit related to system alarms. Thus, a factory automation system can review collected data and automatically and/or semi-automatically schedule maintenance of a device, replacement of a device, and other various procedures that relate to automating a process.

In typical control applications, alarms are generated when a process variable value lies outside a predefined expected range, when a sensed parameter lies outside an expected range, when particular user action is undertaken (such as depression of an emergency stop), and the like. These alarms provide an indication to an operator or device that an unexpected event has occurred with respect to a particular control process. In another example, alarms that are not associated with a high level of urgency can be created and logged, and may not be provided to an operator unless a more urgent, related alarm occurs. Thereafter, logs can be parsed in an effort to determine a source of failure with respect to a control process.

Conventionally, field devices produce or consume data and are monitored by a higher-level system, such as a Manufacturing Execution System (MES). These higher-level systems analyze data being produced and/or consumed on a factory floor and generate alarms if monitored data lies outside a predefined range. These alarms are typically created through use of static rules, which often do not account for the dynamic nature of a manufacturing process.

SUMMARY

The following presents a simplified summary of subject matter described in more detail herein in order to provide a basic understanding of some aspects of such subject matter. This summary is not an extensive overview, and is not intended to identify key/critical elements or to delineate the scope of the subject matter described herein. Its sole purpose is to present some concepts in a simplified form as a prelude to the more detailed description that is presented later.

Briefly described, the subject disclosure pertains to automatic provision of alarms/events to entities that subscribe to such alarms/events. In more detail, devices and/or users within industrial environments subscribe to particular alarms and/or events. For instance, if an operator may wish to receive an alarm relating to temperature fluctuation with respect to a line for which the operator is responsible. Therefore, any time such an alarm/event is generated, the alarm/event is provided to the operator. The subject disclosure relates to not only providing a subscribing entity with alarms/events to which the subscribing entity subscribes, but also to providing the subscribing entity with alarms/events that are related to the subscribing entity. With more specificity, hierarchical relationships of an industrial environment can be analyzed upon a receipt of an alarm/event, and alarms/events that are related to the received alarm/event can be provided to a subscribing entity.

For example, alarms/events can be associated with a type, a subtype, an identifier, and/or other suitable parameters that can be utilized to identify relationships with the alarm/event and other alarms/events. For instance, a type of a received alarm can be recognized, and a subscriber to the received alarm can receive the alarm as well as alarms that are instances of subtypes of the received alarm. In other words, the subscribing entity can receive the alarm and children of such alarm. In another example, a subscribing entity can receive an alarm that is an instance of a particular subtype, and alarms that are instances of a parent type can be automatically provided to the subscribing entity. The system can additionally be dynamic in that user input can dictate associations between alarms/events. For instance, a user can provide input relating to how a certain alarm/event is related to another alarm/event, such that if both alarms/events are created within a threshold time of one another, the user would like to receive both alarms/events. Moreover, alarms/events of user-defined types can be created and related to other alarms (which may or may not be associated with a user-defined type).

In another aspect, alarms/events associated with industrial systems, devices, and/or processes can be quickly reviewed. Pursuant to an example, a graphical user interface can be provided that includes a hierarchical display of areas, systems, devices, processes, and/or the like. A user can then select a "branch" of the hierarchy and can cause alarms/events associated with the selected branch to be displayed to the user. The user can additionally request that alarms/events with respect to other associated devices, areas, processes, etc. be provided for analysis. For instance, alarms/events can be filtered based upon time, such that only alarms/events generated within a threshold amount of time of creation of a selected alarm are displayed to the user.

To the accomplishment of the foregoing and related ends, certain illustrative aspects are described herein in connection with the following description and the annexed drawings.

These aspects are indicative, however, of but a few of the various ways in which the principles of the invention can be employed and such subject matter is intended to include all such aspects and their equivalents. Other advantages and novel features will become apparent from the following detailed description when considered in conjunction with the drawings.

DETAILED DESCRIPTION

Figure 1:
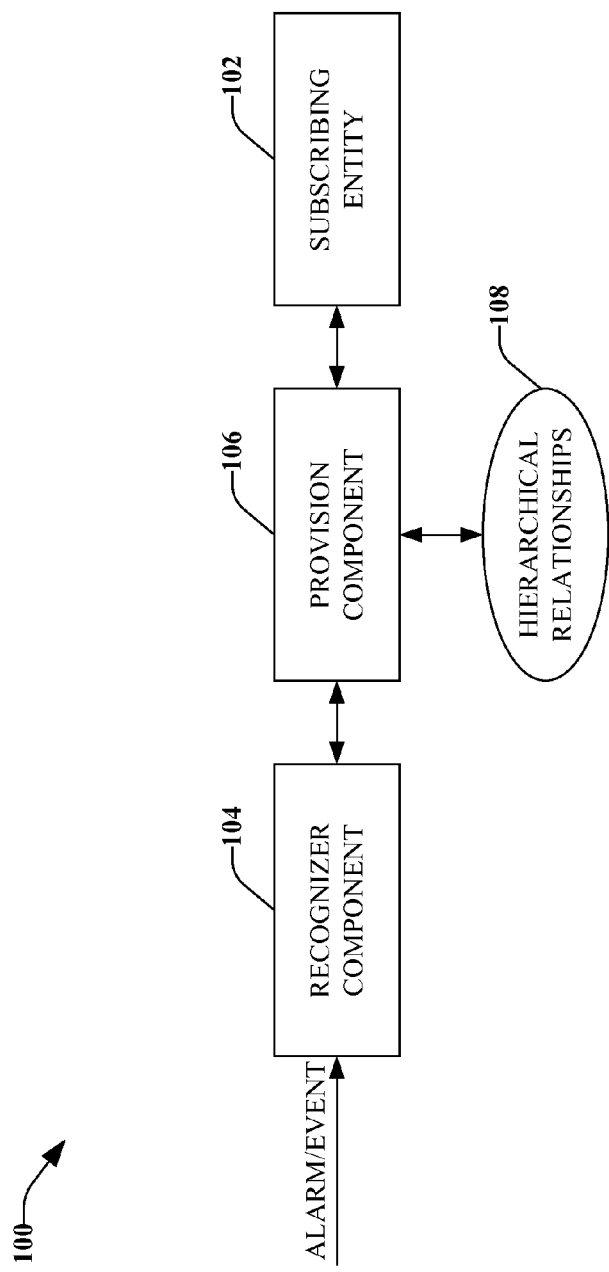
FIG. 1 illustrates an example alarm/event provision system.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that such matter can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component may be, but is not limited to a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

Furthermore, aspects of the disclosed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

Now referring to the drawings, FIG. 1 illustrates a system 100 that facilitates automatic provision of alarms/events to an operator or device based at least in part upon one or more defined hierarchical relationships within an industrial environment. The system 100 includes a subscribing entity 102 that can subscribe to particular alarms and/or events. Therefore, when an alarm/event is created and such alarm/event is subscribed to by the subscribing entity 102, the alarm/event is automatically provided to such subscribing entity 102. Alternatively, the subscribing entity 102 can poll a memory location for certain alarms and/or events.

The system 100 additionally includes a recognizer component 104, which recognizes an alarm/event and determines which entities subscribe to such alarm/event. For example, the recognizer component 104 can analyze an identifier associated with an alarm/event and can recognize such alarm/event based upon the analysis. Thus, the recognizer component 104 can discern an identity associated with an alarm/event and can access a data repository (not shown) to determine which entities (devices and/or individuals) subscribe to the alarm/event. The recognizer component 104 is communicatively coupled to a provision component 106, which can provide the identified alarm and event to the subscribing entity 102. Additionally, the provision component 106 can analyze hierarchical relationships 108 associated with an industrial manufacturing environment and can provide the subscribing entity 102 with the alarm/event determined by the recognizer component 104 and other associated information based upon the analysis of the hierarchical relationships 108. The associated information can include other alarms and events, including parent or child events.

Pursuant to an example, the hierarchical relationships 108 can be amongst devices within an industrial manufacturing process, thereby creating "parent-child" relationships amongst devices. For instance, the hierarchical relationships 108 can conform to ISA S95, ISA S88, and/or a combination thereof. Still further, alarms and/or events can be associated with a hierarchical relationship, such that a "parent-child" relationship may exist amongst events and/or alarms. At least some of the hierarchical relationships can be user-defined and may be specific to a certain user. For example, a user may associate an event related to a pump with an event related to a press. Thus, when the recognizer component 104 determines that the event associated with the pump has been logged, the provision component 106 can analyze the hierarchical relationships 108 and automatically provide the user with the event related to the press (if recently logged).

The hierarchical relationships 108 can also be utilized to locate alarms and events. For instance, a graphical depiction of a hierarchy of nodes within an industrial environment can be provided, and a node within such hierarchy can be selected. Thereafter, alarms and/or events associated with such node (e.g., events logged over a threshold period of time) can be provided to a user. Moreover, upon depression of a graphical button or through entry of certain commands, events/alarms associated with nodes that are children (below the selected node in the hierarchy) of the selected nodes can be provided to the user. Thus, a hierarchy can be navigated and information can be provided to the user based at least in part upon a selected area or region. As binding of alarms/events occurs through association by area, objects and/or devices can be easily added and/or removed from the hierarchy and automatic discovery of certain alarms and/or events can be undertaken. Furthermore, activity of a user can be monitored and alarms/events and/or views associated therewith can be filtered based upon previous user actions, current context, stored user preferences, and the like.

Figure 2:
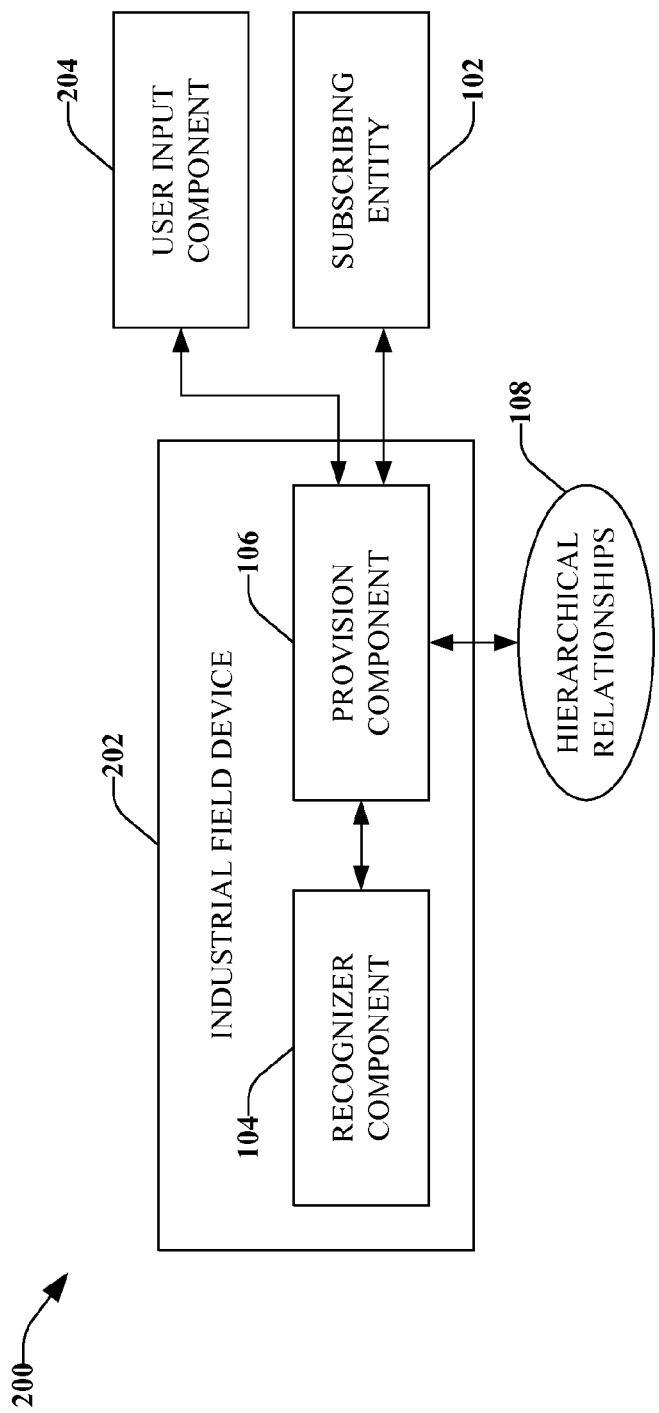
FIG. 2 illustrates an example industrial field device that facilitates provision of alarms/events.

Turning now to FIG. 2, a system 200 that facilitates provision of alarms and/or events based at least in part upon definitions of hierarchical organization associated with an industrial environment is illustrated. The system 200 includes the subscribing entity 102, which receives alarms and/or events from an industrial field device 202. More particularly, the subscribing entity 102 can subscribe to events logged by the industrial field device 202, wherein the industrial field device 202 can be a controller, an alarm server, a pump, a press, and/or the like. Thus, when an alarm/event is generated by the industrial field device 202 and/or received by the industrial field device (from another device that generated the alarm/event), the recognizer component 104 therein can determine that the subscribing entity 102 subscribes to the alarm/event. The provision component 106 can then analyze the hierarchical relationships 108 to determine if the subscribing entity 102 should be provided with additional, related alarms/events.

The system 200 additionally includes a user input component 204 that enables a user to provide information to the provision component 106 regarding alarms/events that are provided to the subscribing entity 102. While shown as being external to the subscribing entity 102, it is to be understood that the user input component 204 can be within the subscribing entity 102. The user input component 204 enables a user to modify the hierarchical relationships 108 with respect to the subscribing entity 102. For example, even though two events are related, the user may find that receipt of a second event is superfluous and obfuscates reasons for being provided with a first event. Thus, through the user input component 204, a user can update events that are subscribed to as well as the hierarchical relationships 108.

The user input component 204 can also allow a user to customize alarms and/or events that are received or will be received in the future. Conventionally, if an individual is provided with an alarm or event, the individual is not able to modify parameters associated with such alarm or event. For instance, severity of an alarm cannot be modified by the individual. The user input component 204 enables a user to modify a received alarm or event prior to transitioning such alarm/event to another recipient or placing the alarm/event within a data repository. In an example, the user input component 204 can be employed to enable a user to alter severity assigned to an alarm and/or event, message associated with an alarm and/or event, categorization associated with an alarm and/or event, and the like. Thus, system-generated events can be customized by users (when the users have appropriate security clearance). Prior to enabling modification of an alarm, however, a user's privileges with respect to an alarm can be authenticated. For instance, a certain operator may not be allowed to modify alarms of particular types. In another example, during certain times alarms may not be able to be modified. Thus, various security parameters can be put in place to alleviate concerns associated with malicious operators. Still further, a user can add data to a received alarm by way of the input component 204. Pursuant to an example, an operator may enter corrective action information and/or assignable cause information, which can possibly lead to an automatic alteration of alarm severity.

Figure 3:
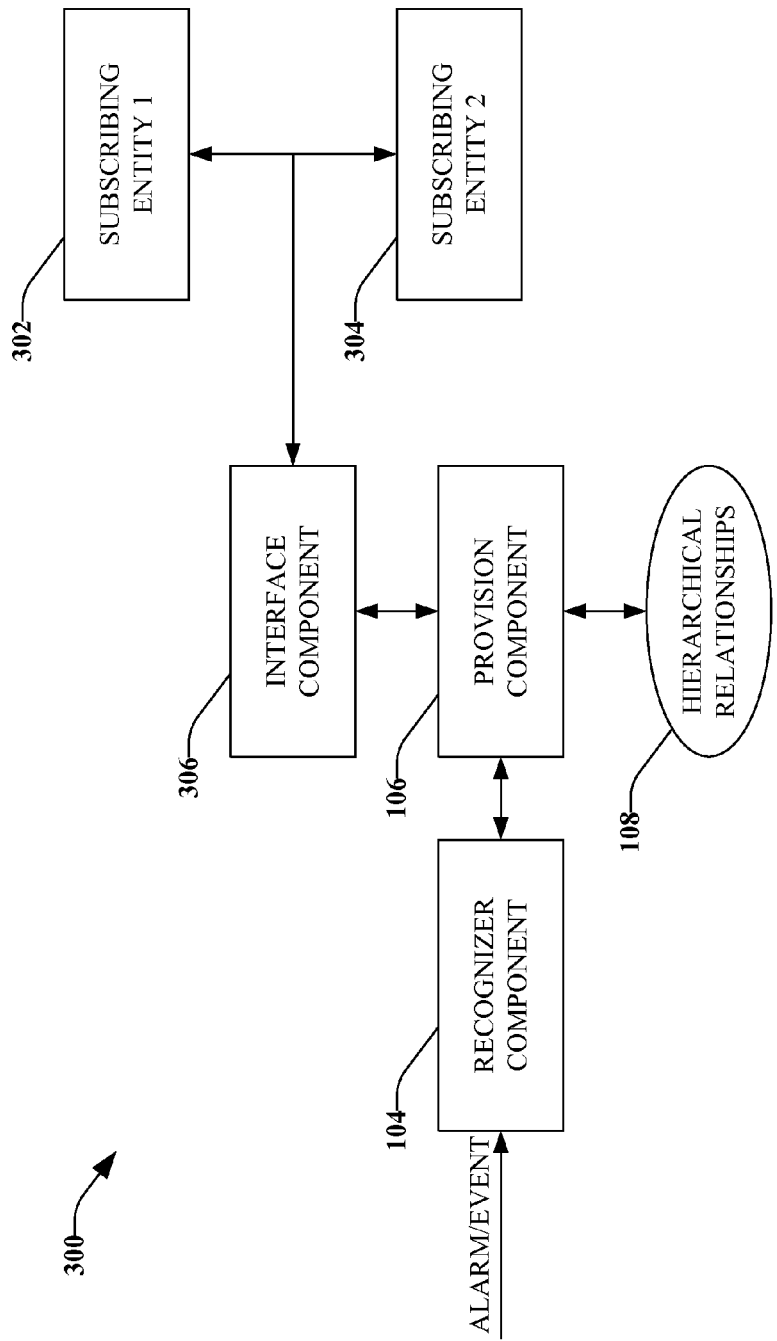
FIG. 3 illustrates an example system that facilitates provision of alarms/events by way of VoIP.

With reference now to FIG. 3, a system 300 that facilitates inter-device communication is illustrated. The system 300 includes the recognizer component 104 that receives and recognizes an alarm/event subscribed to by a subscribing entity. For example, the recognizer component 104 can reside within a field device, within an alarm server, or any other suitable device/entity. The recognizer component 104 can recognize the alarm/event based at least in part upon alarm/event origin, type associated with the alarm/event, subtype associated with the alarm/event, an identifier associated with the alarm/event, or other suitable parameter. The provision component 106 is communicatively coupled to the recognizer component 104, and can access hierarchical relationships 108 of an industrial environment to determine alarms/events related to the alarm/event received by the recognizer component 104. For instance, the provision component 106 can locate alarms/events that are parents or children of the received alarm/event.

The alarm/event received by the recognizer component 104 as well as alarms/events located by the provision component 106 can be provided to entities that subscribe to the received alarm/event. In an example, a first subscribing entity 302 and a second subscribing entity 304 can subscribe to at least one alarm provided by the provision component 106. The alarms can be relayed to the entities 302 and 304 by way of an interface component 306, which can cause the alarms to be provided over a common interface. For instance, the interface component 306 can package alarms and events such that they are relayed by way of Voice over Internet Protocol (VoIP). This enables the subscribing entity 304 and the subscribing entity 306 to communicate with one another by way of a common protocol. Moreover, alarms can also include information formatted in a variety of manners, including video, voice, and/or the like.

Figure 4:
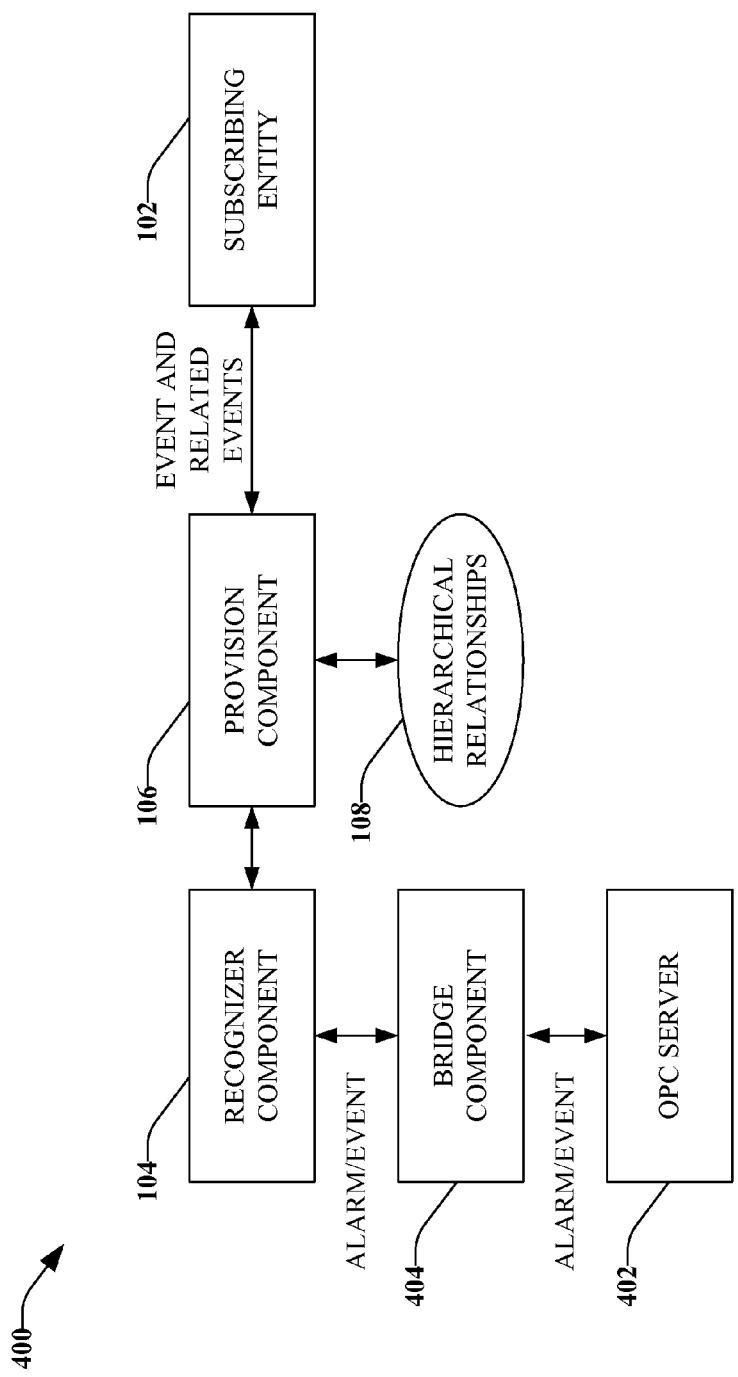
FIG. 4 illustrates an example alarm provision system that can reformat alarms associated with OLE for Process Control (OPC).

Now turning to FIG. 4, a system 400 that facilitates automatic provision of alarms/events to a subscribing entity is illustrated. The system includes an Object Linking and Embedding for Process Control (OPC) server 402, which generates alarms/events, retains alarms/events, and/or relays alarms/events from other devices to a bridge component 404. The OPC server 402 enables industrial devices from different manufactures to communicate with one another. The bridge component 404 is utilized to reformat alarms/events from the OPC server 402 to a format that can be interpreted by subscribing entities or other suitable components. In an example, the bridge component 404 can receive an alarm/event from the OPC server 404, and can format the alarm/event such that it can be interpreted by the recognizer component 104 and/or received/interpreted by the subscribing entity 102. The recognizer component 104 can recognize the alarm/event and can pass the identity of the alarm/event to the provision component 106. The provision component 106 can analyze the hierarchical relationships 108 that may be associated with the alarm/event and can provide the alarm/event (and related alarms/events) to the subscribing entity 102. For example, the provision component 106 can access an alarm server and provide the subscribing entity 102 with alarms related to the recognized alarm/event.

In a detailed example, the bridge component 404 can receive an alarm from a particular geographic region from the OPC server 402. The bridge component 404 can format the alarm such that it can be analyzed by the recognizer component 104, and the recognizer component can analyze the alarm to determine whether the subscribing entity 102 desires to receive such alarm. This determination can be made by reviewing a database that includes subscription information relating to the subscribing entity, wherein the database can include types of alarms subscribed to by the subscribing entity 102, subtypes of alarms subscribed to by the subscribing entity, and/or the like. The provision component 106 can thereafter review the hierarchical relationships 108 to determine devices and/or alarms related to the received alarm. In an example, the provision component 106 can search for alarms that are "children" of the received alarm that were generated within a threshold amount of time from receipt of the alarm, wherein the threshold can be user defined or programmatically defined.

Figure 5:
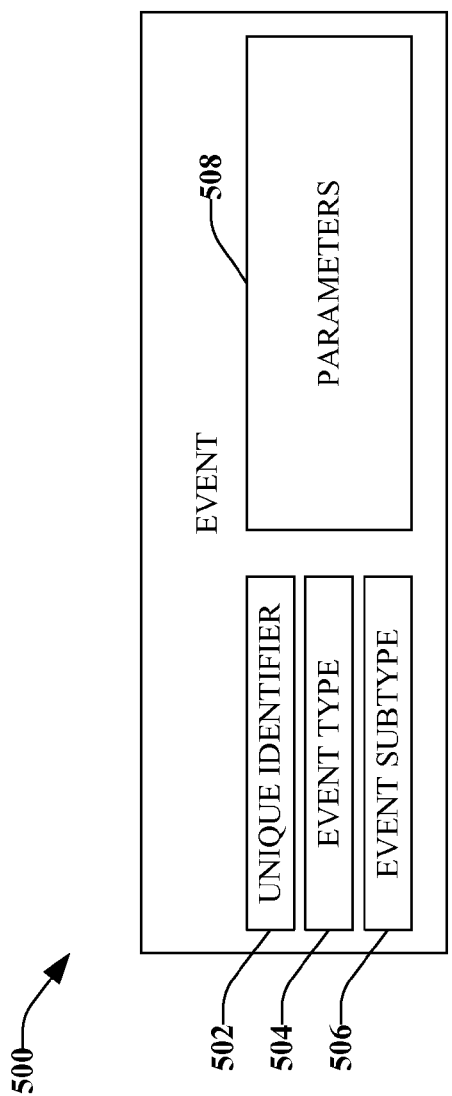
FIG. 5 illustrates an example alarm/event.

Now referring to FIG. 5, an example event 500 is illustrated, wherein the event can be subject to a subscription with respect to a subscribing entity within an industrial environment. The event 500 includes an identifier 502, which can uniquely identify the event 500 or identify a plurality of related events. For instance, events that are associated with field devices in a same region can be assigned a substantially similar identifier. The event can also include an event type 504 and an event subtype 506. Thus, subscribing entities that subscribe to instances of the event type 504 can receive the event 500. Similarly, subscribing entities that subscribe to instances of the event subtype 506 can receive the event 500. The event 500 can additionally include parameters 508 that describe the event 500. For example, the parameters can include a detailed description of the event, an operator associated with the event, time of occurrence of the event, etc. The identifier 502, type 504, subtype 506, and/or parameters 508 can be analyzed to aid in determining alarms/events that are hierarchically associated with the event 500.

Figure 6:
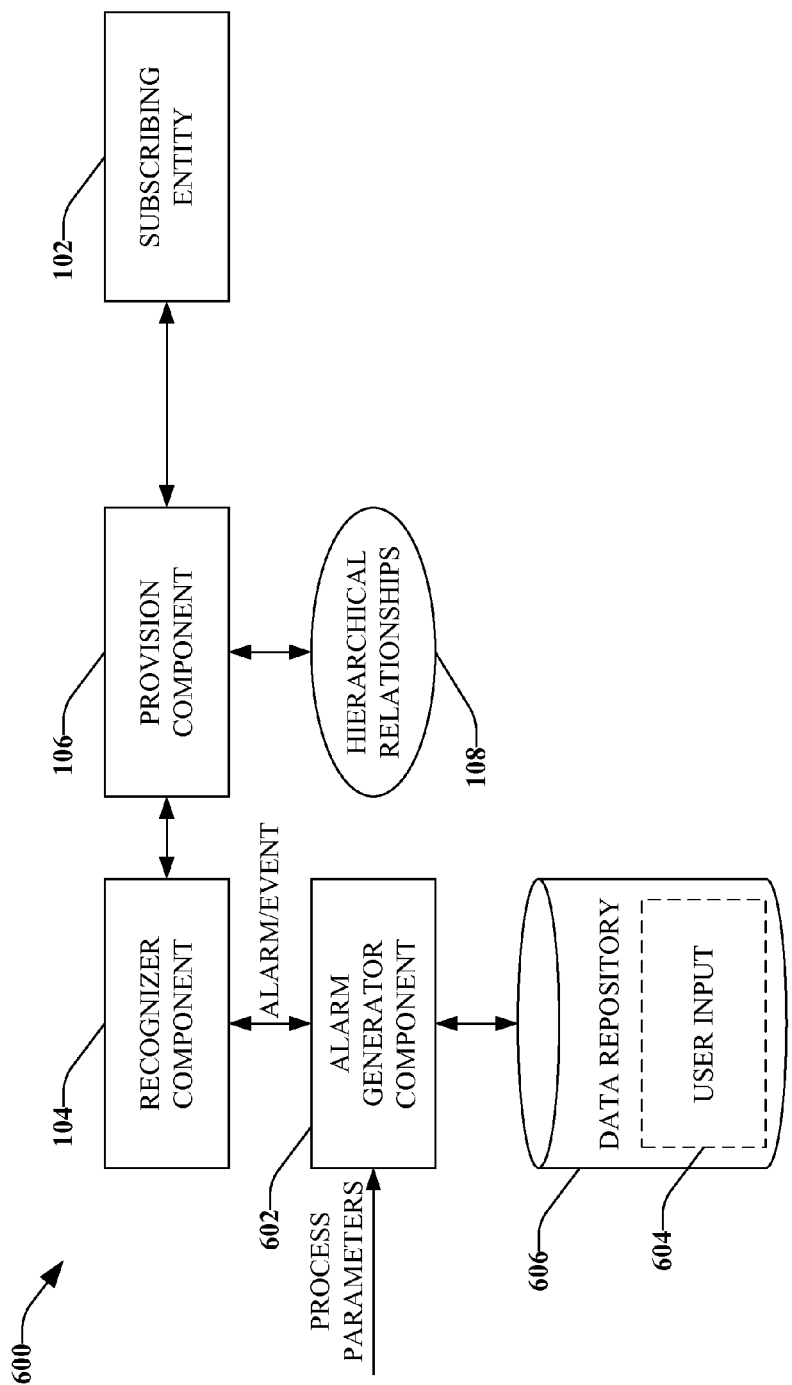
FIG. 6 illustrates an example alarm generation/provision system, wherein alarms/events are generated/provided based at least in part upon user input.

Turning now to FIG. 6, a system 600 that facilitates provision of alarms/events to a subscribing entity within an industrial environment is illustrated. The system 600 includes an alarm generator component 602 that receives parameters relating to an industrial process. For example, the alarm generator component 602 can receive parameters relating to status of a device or system, status of a process, state of an alarm, state of a system, device, and/or process, temperature range, value of a process variable, and/or the like. The alarm generator component 602 can create alarms/events based at least in part upon the received process parameters.

The alarm generator component 602 can also create alarms/events based at least in part upon user input 604 retained within a data repository 606. This enables creation of user-defined types of alarms and/or user-generated alarms. Additionally, the user input 604 can relate to when and how alarms are delivered to particular users, what types of parameters cause alarms/events to be delivered to certain users, to which devices alarms should be delivered, format of certain alarms, etc. Moreover, users can create user-defined types of alarms, and certain process parameters received by the alarm generator component 602 can cause an event of a user-defined type to be created.

When the alarm generator component 602 creates an alarm/event, such alarm/event can be received by the recognizer component 104. The recognizer component 104 can, for instance, determine a type of alarm (which may be a user-defined type), a subtype of the alarm (which may also be user-defined), and other suitable parameters. The recognizer component 104 can also determine that the subscribing entity 102 desirably receives the alarm/event created by the alarm generator component 602. The provision component 106 can receive an analysis undertaken by the recognizer component 104 and can review the hierarchical relationships 108 given the identity of the alarm and/or an identity of the subscribing entity 102. The provision component 106 can provide the subscribing entity 102 with alarms/events that are hierarchically related to the alarm/event created by the alarm generator component 602. For instance, user-defined types of alarms/events that are related to the generated alarm/event (e.g., hierarchically related) can be located and provided to the subscribing entity 102.

Figure 7:
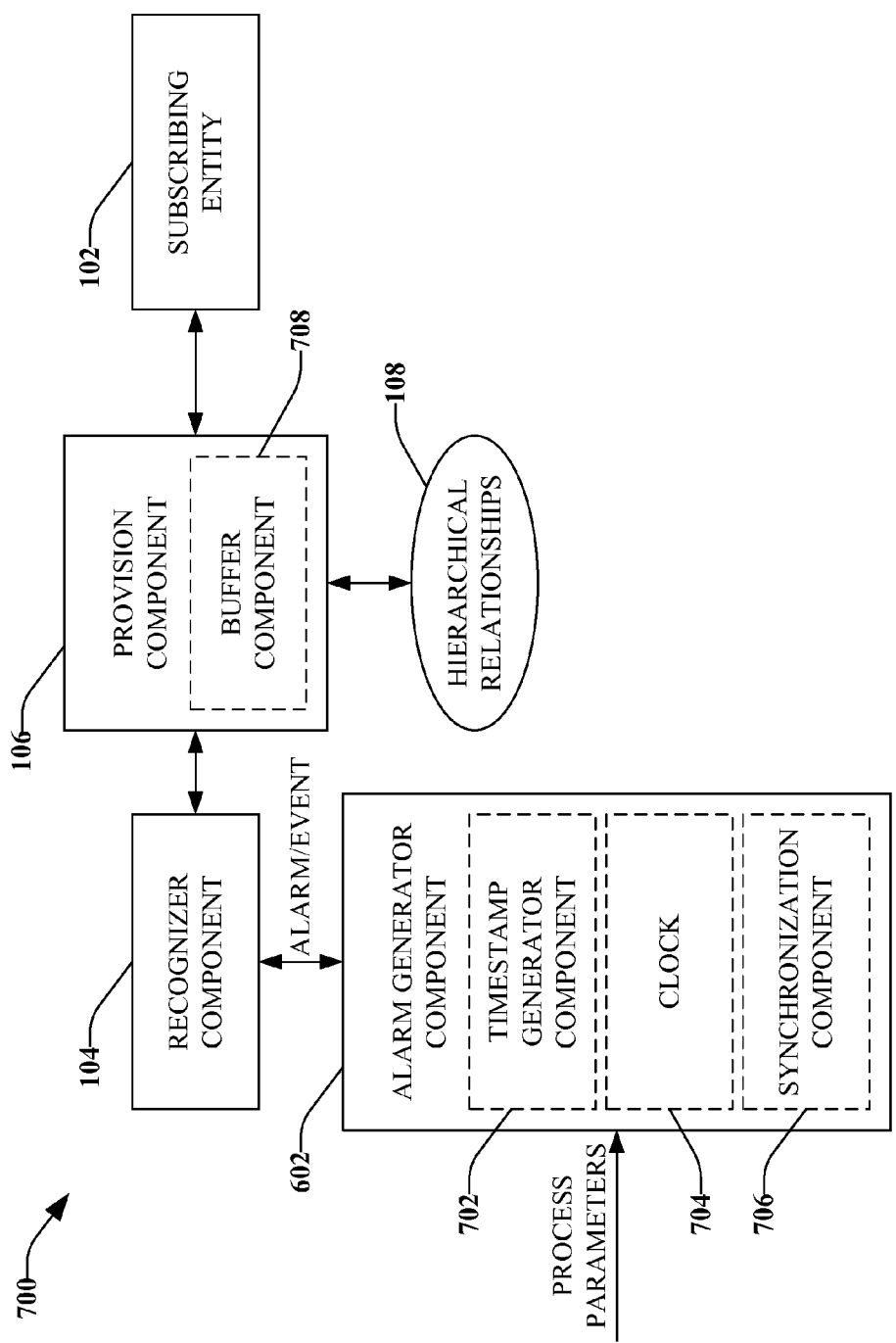
FIG. 7 illustrates an example alarm generation/provision system.

Now referring to FIG. 7, a system 700 that facilitates provision of alarms to a subscribing entity is illustrated. The system 700 includes the alarm generator component 602, which receives process parameters and creates an alarm/event based at least in part upon an analysis of the received parameters. For instance, the alarm generator component 602 can reside within a field device, such as an industrial controller. Pursuant to an example, a value associated with a process variable can be analyzed and the alarm generator component 602 can create an alarm/event if the value is outside a predefined threshold.

The alarm generator component 602 includes a timestamp generator component 702 that can create timestamps and associate the timestamp with an alarm/event created by the alarm generator component 602. The timestamp generator component 702 can utilize a clock 704 associated with the alarm generator component 602 in connection with creating timestamps and associating timestamps with a created alarm. Additionally, the clock 704 can be synchronized with clocks of several field devices within an industrial environment, thereby creating a system-wide time. Thus, alarms/events created within an industrial automation environment can be indexed according to time. To aid in such synchronization, the alarm generator component 602 can be associated with a synchronization component 706 that synchronizes the clock 704 with a plurality of other clocks within an industrial environment. Pursuant to an example, a master clock (not shown) can periodically or sporadically provide an indication of a system-wide time to the synchronization component 706, which can then set the clock 704 in accordance with the system-wide time. Moreover, the synchronization component 706 can cause the clock 704 to act as a master clock, and time associated with the clock 704 can be utilized to set times related to other clocks within an industrial environment.

An alarm/event created by the alarm generator component 602 can then be provided to the recognizer component 104, which can determine a type related to the alarm/event, a subtype related to the alarm/event, an intended recipient of the alarm/event (e.g., the subscribing entity 102). The provision component 106 can receive the analysis undertaken by the recognizer component 104, and can analyze the hierarchical relationships 108 given the receipt of such analysis from the recognizer component 104. The provision component 106 can locate alarms/events that are hierarchically associated with the received alarm/event. In an example, the provision component 106 can locate related alarms/events that have been created within a threshold amount of time. More particularly, the provision component 106 can analyze timestamps associated with related alarms/events and locate related alarms/events (e.g., hierarchically related) that were generated within a certain amount of time of generation of the alarm/event created by the alarm generator component 602.

The provision component 106 can additionally include a buffer component 708 that can selectively cache the received alarm/event and related alarms/events. For instance, the subscribing entity 102 may be an alarm server that goes offline, and the buffer component 708 can cache the alarm/event and related alarms/events until the subscribing entity 102 comes back online. Such selective caching ensures that the subscribing entity 102 will eventually receive suitable alarms/events. Additionally, the buffer component 708 can cause alarms/events retained within a cache to alter given different parameters. For instance, depending upon current time, the buffer 708 component can alter alarms that are retained within the cache. Moreover, the buffer component 708 can alter contents of the cache depending upon received alarms and area/zone associated therewith. The buffer component 708 can dynamically alter contents of the cache based at least in part upon bindings described by subscribing entities.

Figure 8:
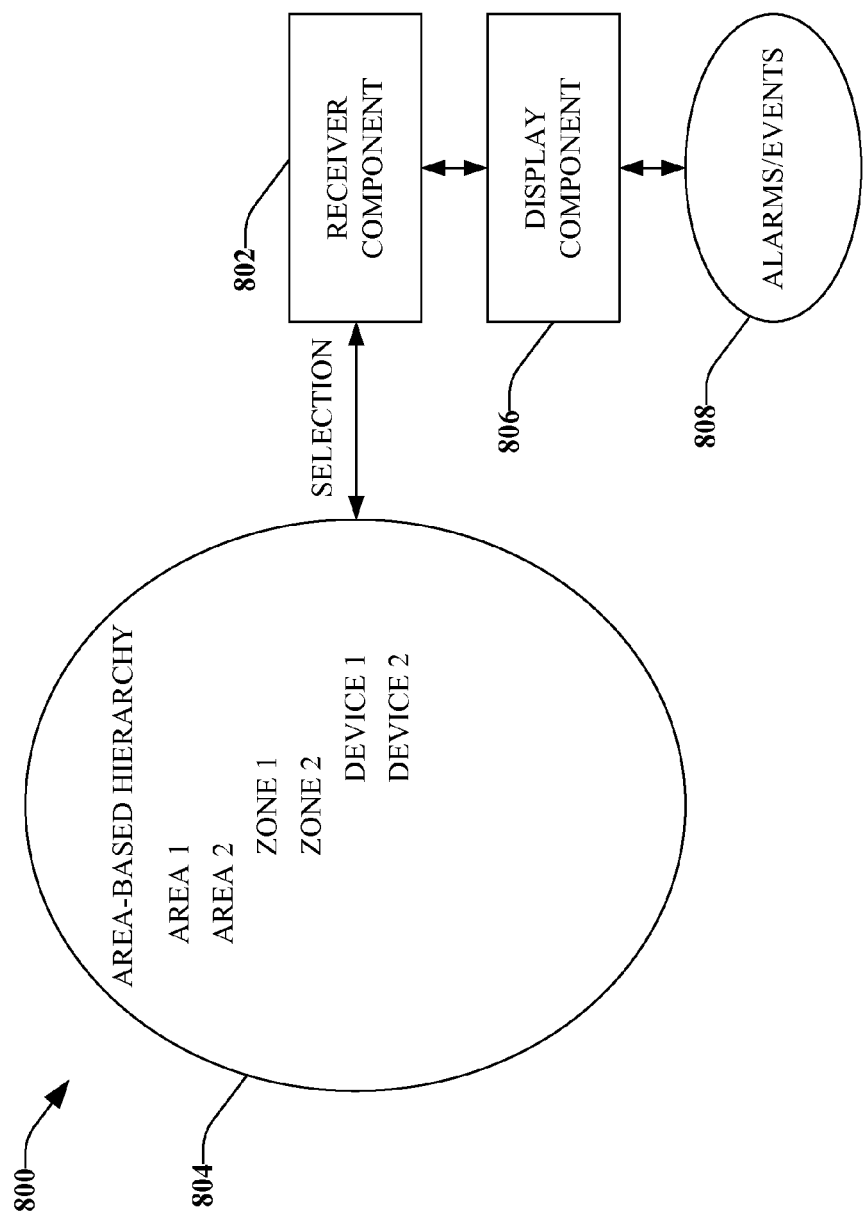
FIG. 8 illustrates an example alarm/event display system.

With reference now to FIG. 8, a system 800 that facilitates review of alarms/events and related alarms/events is illustrated. The system 800 includes a receiver component 802 that receives a selection of an entity within an area-based hierarchy 804. For instance, a user can select an area, a zone, a device, a series of devices, and/or the like. For instance, the area-based hierarchy 804 can be based upon ISA S95, ISA S88, and/or a combination thereof. A display component 806 can then display alarms/events 808 that are associated with the selected area, device, etc. Pursuant to an example, if an area is selected, then alarms that are related to such area can be displayed to a requesting party.

Figure 9:
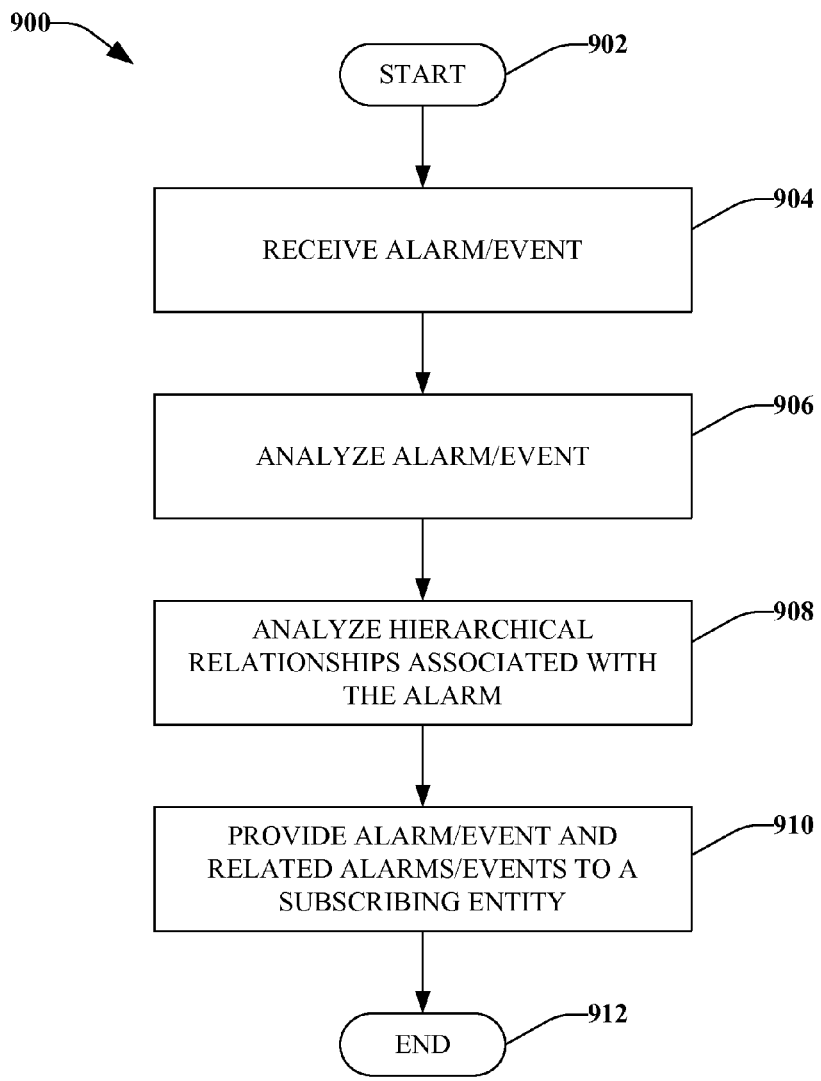
FIG. 9 is a representative flow diagram illustrating an example methodology for providing alarms/events to a subscribing entity.
Figure 10:
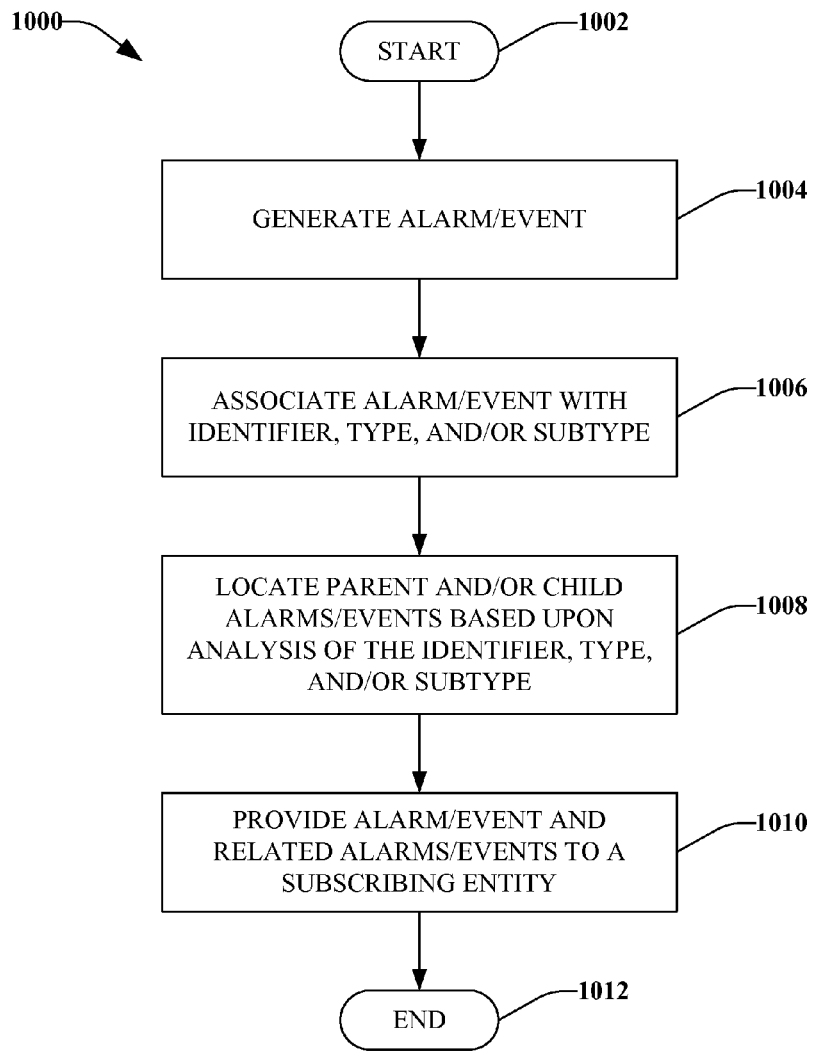
FIG. 10 is a representative flow diagram illustrating an example methodology for providing parent and/or children alarms/events given receipt of a particular alarm/event.
Figure 11:
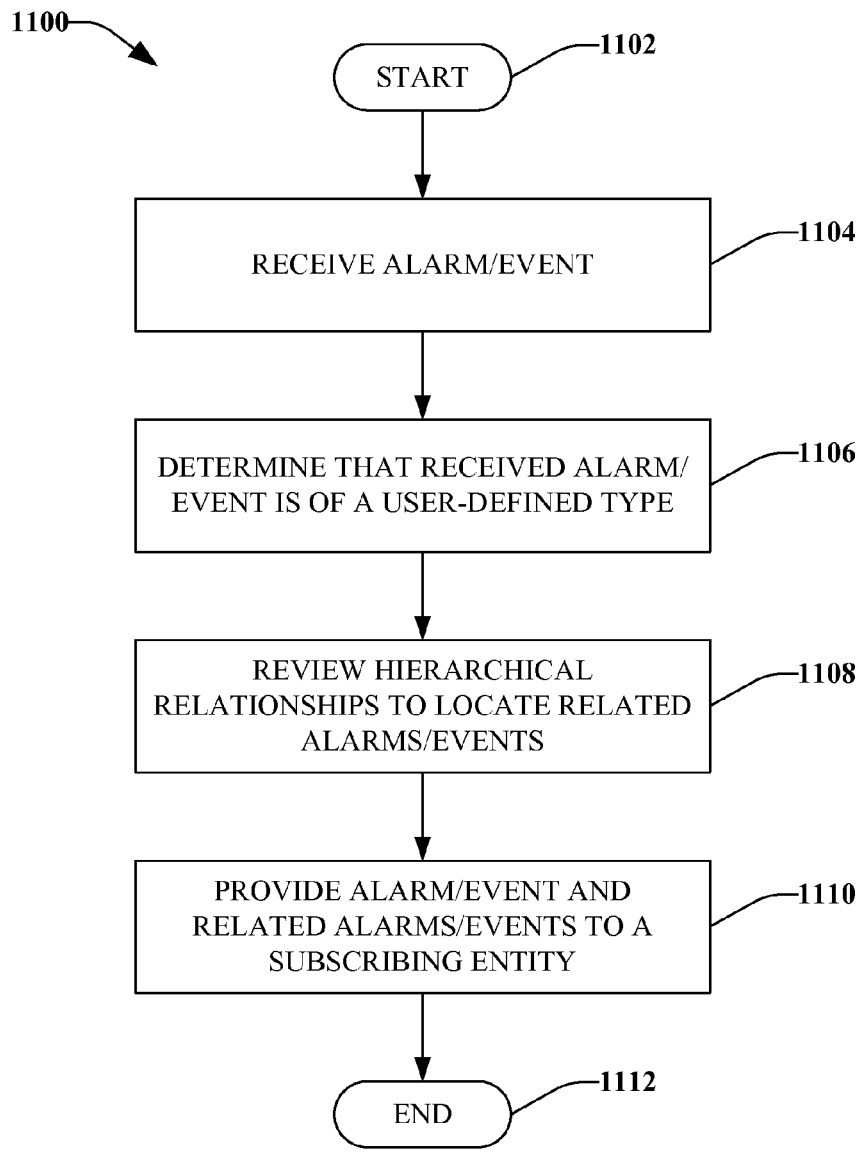
FIG. 11 is a representative flow diagram illustrating an example methodology for providing alarms/events that are related to an alarm/event of a user-defined type to a subscribing entity.

Turning to FIGS. 9-11, methodologies relating to provision of alarms to subscribing entities are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring specifically to FIG. 9, a methodology 900 for providing alarms/events to a subscribing entity is illustrated. For instance, a subscribing entity can be a particular operator, a device utilized by an operator, an industrial controller or other suitable field device, a network infrastructure device, an alarm server, or any other suitable entity that may desirably receive particular alarms/events. The methodology 900 starts at 902, and at 904 an alarm/event is received. For example, an industrial controller or other suitable field device can create and alarm/event and publish such alarm/event. At 906, the alarm/event is analyzes. For instance, an alarm/event can be associated with a certain type, such that the alarm/event is an instance of such type. Similarly, the alarm/event can be related to a subtype, such that the alarm/event is an instance of the subtype. Moreover, the alarm/event can be associated with an identifier, which can uniquely identify the alarm/event or identify a plurality of related alarms/events. Still further, alarms/events can include information regarding which device generated the alarm/event, where such device resides within a regional hierarchy, and/or other suitable information.

At 908, hierarchical relationships associated with the alarm/event can be analyzed. Pursuant to an example, a data model that is hierarchically structured can be utilized within an industrial automation environment. Additionally, controllers and other field devices can be configured to produce and consume data that accords to the hierarchically structured data model. Therefore, an alarm/event can be associated with certain "rungs" of the hierarchy. The data model can be based at least in part upon ISA S95, ISA S88, and/or a combination thereof. The hierarchical relationships associated with the received alarm/event can be utilized to locate related alarms/events. For instance, if the received alarm/event is an instance of a particular type, other instances of such type can be located. Additionally, instances of alarms that are subtypes of the received alarm can be retrieved. At 910, the alarm/event and related alarms/events are provided to an entity that subscribes to the received alarm/event. The methodology 900 then completes at 912.

Now turning to FIG. 10, a methodology 1000 for providing alarms/events to a subscribing entity is illustrated. The methodology 1000 starts at 1002, and at 1004 an alarm/event is generated. For instance, the alarm/event can be created within a field device, within an alarm server, and/or the like. At 1006, the alarm/event is associated with an identifier, a type, and/or a subtype. The association can be undertaken at a time the alarm is generated, for instance. In an example, an industrial controller can create an alarm and associate such alarm with an identifier, a type and/or a subtype. Alternatively, an alarm can be associated with a type, subtype, and/or identifier by a proxy device. For example, a simple alarm can be generated at a field device and then provided to a proxy device (which may be a piece of hardware coupled to the field device). The proxy device can analyze the simple alarm and determine that the alarm is of a particular type. The proxy device can then alter the alarm (e.g., add a header and/or modify a header) such that the alarm type is indicated. Use of a proxy device enables legacy devices (field devices not able to create alarms that accord to a hierarchically structured model) to be utilized in an updated industrial automation environment.

At 1008, parent and/or child alarms/events are located based upon an analysis of the identifier, type, and/or subtype. For example, alarm instances of a particular subtype generated within a threshold amount of time of generation of the received alarm/event can be located. Thus, any suitable parent or child alarms/events (with respect to the received alarm/event) can be located by analyzing hierarchical relationships within an industrial automation environment. At 1010, the alarm/event and related alarms/events are provided to a subscribing entity. The methodology 1000 then completes at 1012.

With reference now to FIG. 11, a methodology 1100 for providing related alarms/events to a user upon the user selecting a portion of an area hierarchy within an industrial environment is illustrated. The methodology 1100 starts at 1102, and at 1104 an alarm/event is received. At 1106, a determination is made that the received alarm/event is of a user-defined type. For instance, a user, through employment of an editor, can create customized alarms/events and can associate the alarms/events with a user-defined type, subtype, etc. At 1108, hierarchical relationships associated with the received alarm/event are reviewed to locate alarms/events that are related to the received alarm/event, and at 1110, the alarm/event and related alarms/events are provided to a subscribing entity. The methodology 1100 then completes at 1112.

Figure 12:
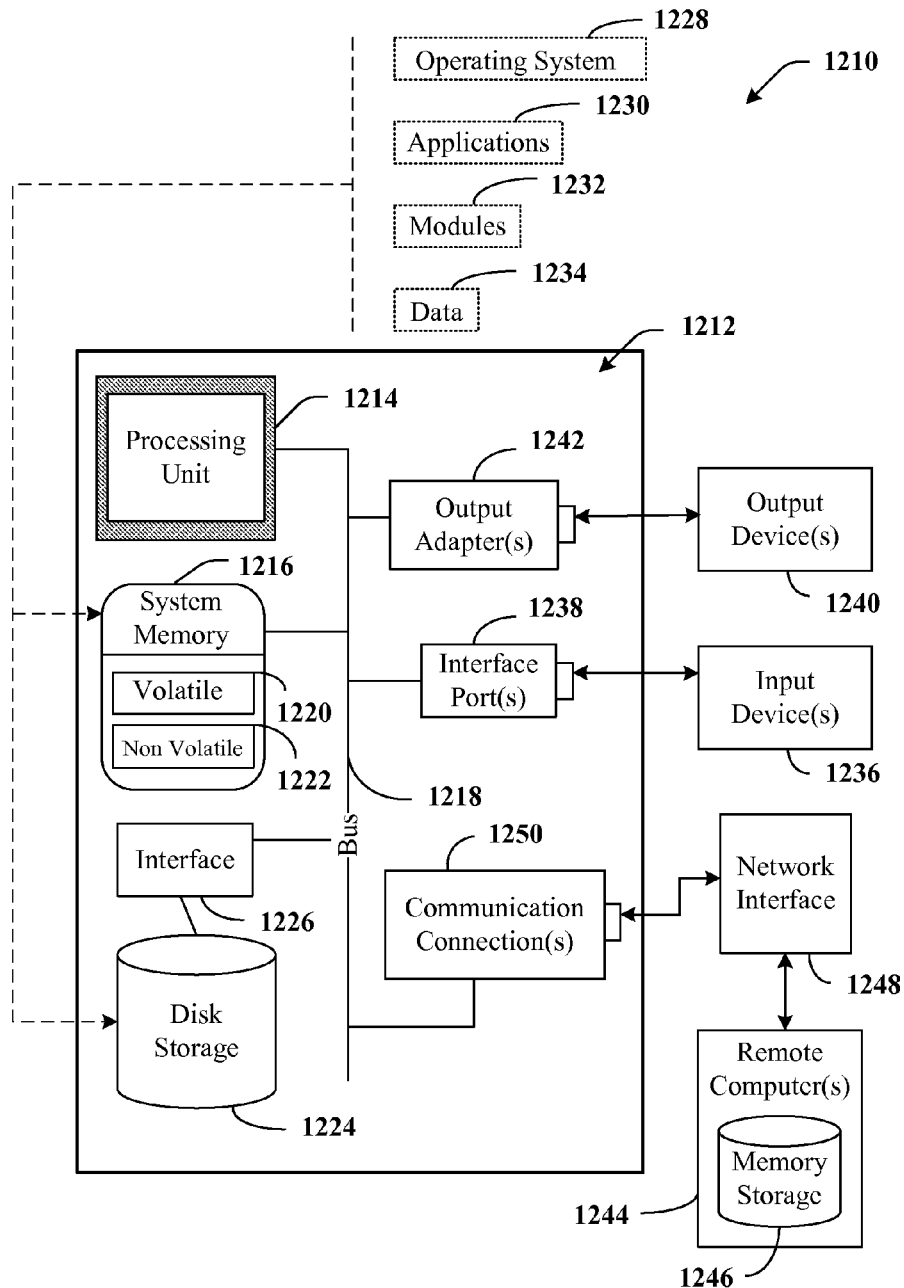
FIG. 12 is an example computing environment.

With reference to FIG. 12, an example environment 1210 for implementing various aspects of the aforementioned subject matter, including locating alarms/events through an analysis of hierarchical relationships, includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable PROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the subject invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

Figure 13:
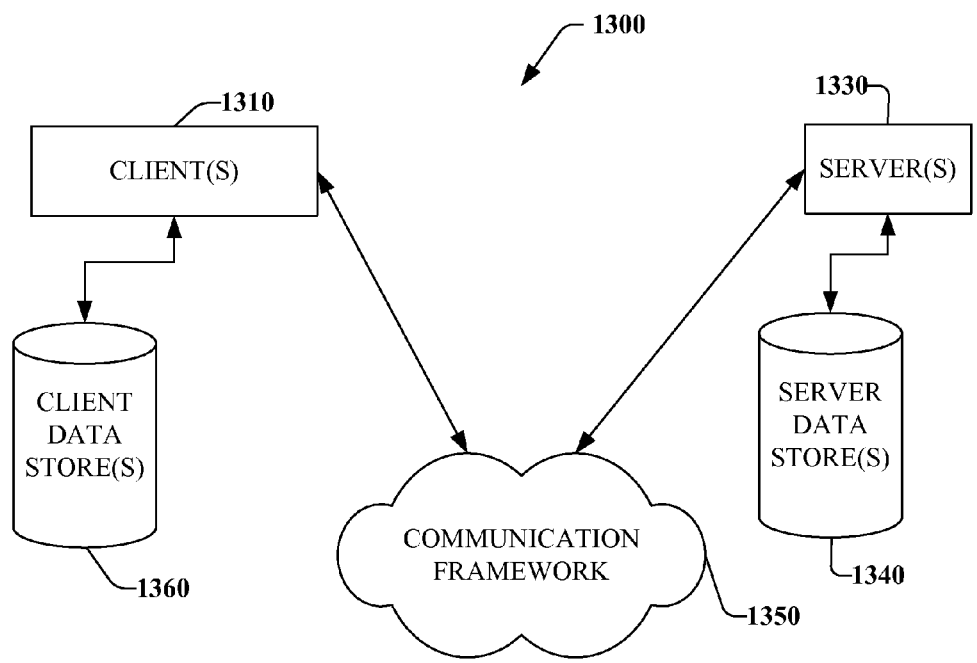
FIG. 13 is an example networking environment.

FIG. 13 is a schematic block diagram of a sample-computing environment 1300 with which the disclosed subject matter can interact. The system 1300 includes one or more client(s) 1310. The client(s) 1310 can be hardware and/or software (e.g., threads, processes, computing devices). The system 1300 also includes one or more server(s) 1330. The server(s) 1330 can also be hardware and/or software (e.g., threads, processes, computing devices). The servers 1330 can house threads to perform transformations by employing the subject invention, for example. One possible communication between a client 1310 and a server 1330 can be in the form of a data packet adapted to be transmitted between two or more computer processes. The system 1300 includes a communication framework 1350 that can be employed to facilitate communications between the client(s) 1310 and the server(s) 1330. The client(s) 1310 are operably connected to one or more client data store(s) 1360 that can be employed to store information local to the client(s) 1310. Similarly, the server(s) 1330 are operably connected to one or more server data store(s) 1340 that can be employed to store information local to the servers 1330.

What has been described above includes examples of the claimed subject matter. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
   a recognizer component configured to determine a subscriber of an alarm based upon an identifier associated with the alarm; and
   a provision component configured to provide the alarm to the subscriber; wherein the recognizer component and provision component reside within an industrial device.

2. The system of claim 1, wherein the recognizer component is further configured to access a data repository to facilitate creation of a user defined alarm based on data stored in the data repository.

3. The system of claim 1, further comprising a user input component configured to facilitate customization of an alarm.

4. The system of claim 3, wherein the alarm customization is at least one of an alteration of a severity of the alarm, an alteration of a categorization of the alarm, an alteration of a message associated with the alarm, an alteration of a system generated event associated with the alarm, an addition of data to the alarm, or a modification of a hierarchical relationship between the subscriber and the alarm.

5. The system of claim 3, wherein the alarm customization is a function of a security parameter associated with an entity which instigates the alarm customization.

6. The system of claim 3, wherein the alarm customization is a function of time.

7. The system of claim 1, further comprising a bridge component configured to format the alarm into a format recognizable by the at least one subscriber.

8. A method, comprising:
   receiving, at an industrial device, an alarm, wherein the alarm has an associated identifier;
   determining, at the industrial device, based upon the identifier, at least one subscriber of the alarm; and
   initiating provision of, by the industrial device, the alarm to the at least one subscriber.

9. The method of claim 8, further comprising accessing a data repository facilitating creating a user defined alarm based on data stored in the data repository.

10. The method of claim 8, further comprising customizing the alarm.

11. The method of claim 10, wherein the customizing of the alarm includes at least one of altering a severity of the alarm, altering categorization of the alarm, altering a message associated with the alarm, altering a system generated event associated with the alarm, adding data to the alarm, or modifying a hierarchical relationship between the at least one subscriber and the alarm.

12. The method of claim 10, wherein the customizing of the alarm is a function of a security parameter associated with an entity instigating the alarm customization.

13. The method of claim 10, wherein the customizing of the alarm is a function of time.

14. The method of claim 8, further comprising formatting the alarm into a format recognizable by the at least one subscriber.

15. A computer readable storage medium comprising computer executable instructions that, in response to execution, cause a computing system to perform operations, comprising:
    receiving an alarm, wherein the alarm has an associated identifier;
    determining, based upon the identifier, at least one subscriber of the alarm; and
    directing the alarm to the at least one subscriber, wherein the computing system resides in an industrial device.

16. The operations of claim 15, further comprising customizing the alarm.

17. The operations of claim 16, wherein the customizing of the alarm includes at least one of altering a severity of the alarm, altering categorization of the alarm, altering a message associated with the alarm, altering a system generated event associated with the alarm, adding data to the alarm, or modifying a hierarchical relationship between the at least one subscriber and the alarm.

18. The operations of claim 15, further comprising configuring a format of the alarm into a format recognizable by the at least one subscriber.

19. The operations of claim 15, further comprising generating the alarm based on received process parameters.

* * * * *